Oct. 29, 1968     D. F. OTHMER     3,408,294
METHOD FOR REMOVING SCALE-FORMING CONSTITUENTS FROM SEA
WATER AND OTHER SOLUTIONS WHICH FORM SCALE
Filed June 7, 1967

INVENTOR.
DONALD F. OTHMER

United States Patent Office 3,408,294
Patented Oct. 29, 1968

3,408,294
METHOD FOR REMOVING SCALE-FORMING CONSTITUENTS FROM SEA WATER AND OTHER SOLUTIONS WHICH FORM SCALE
Donald F. Othmer, 333 Jay St., Brooklyn, N.Y. 11201
Continuation-in-part of application Ser. No. 252,473, Jan. 18, 1963. This application June 7, 1967, Ser. No. 644,247
11 Claims. (Cl. 210—56)

ABSTRACT OF THE DISCLOSURE

Some soluble materials, principally salts, in sea water and other hard waters, form hard, dense, crystalline deposits or scales on surfaces when the solution is heated to an elevated temperature; and time is allowed for crystallization to take place. A metal wire mesh may fill a part of the volume of a vessel in which the heated solution is maintained for 1 to 200 minutes; and scale is allowed to form during this time on the surfaces of the wire which makes up the mesh. Changing the bulk volume of the metal mesh by compression or expansion due to an external mechanical force, causes the wire in the mesh to flex, and the scale to crack therefrom, in solid particles which may readily be removed from the water, now comparatively soft. If the water then is to be evaporated, the particles may remain in the liquid for further crystallization thereon as the concentration proceeds.

---

Figure 1:
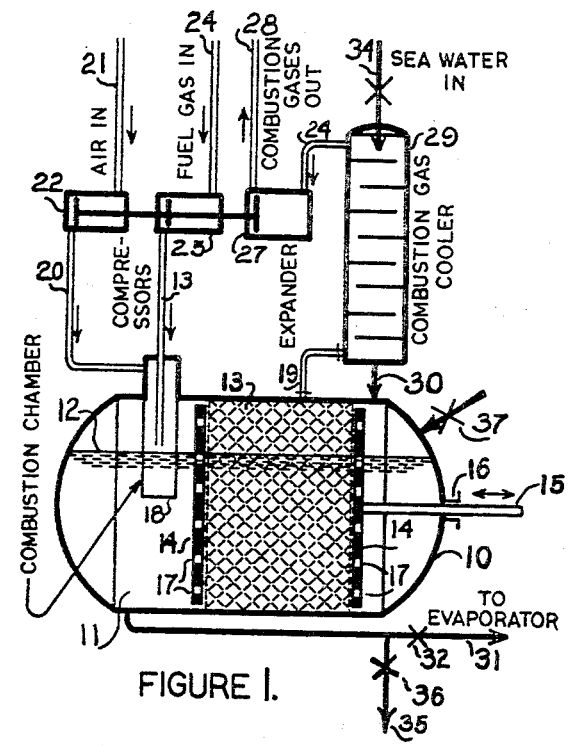

This is a continuation-in-part of application Ser. No. 252,473, filed Jan. 18, 1963, now U.S. Patent 3,329,583 of July 4, 1967, and entitled Method for Producing Pure Water From Sea Water and Other Solutions by Flash Vaporization and Condensation.

This invention related to a method of removing scale, particularly as a related step to evaporation of dilute solutions, e.g., sea water, by multiple flash or other process. Such hard waters form scale when raised to an elevated temperature, due to the presence of salts which: (a) are less soluble in hot than in cold water, or (b) change chemically to other salts, on heating, which are less soluble. The dilute or hard water solution may be heated to a higher temperature than that of the evaporation or other process used, and allowed to remain at this temperature for a long enough time for crystallization of scale-forming constituents on the surface of wires forming an expanded metal mesh. When the wires are well coated with scale, mechanical contraction or expansion of the bulk volume of the wire mesh will then bend the flexible wire of which it is made, which deformation cracks off the scale, the particles of which settle to the bottom of the vessel, from which they are removed as a sludge in a blowdown, or passed with the liquid to the evaporation stages or other processing.

Particularly, the invention is useful wherein the scale-forming liquid is heated to the scale-forming temperature in a high velocity heater—desirably with tubes of high polish—and during a minimum of time of contact with metallic heat transfer surfaces. A high rate of circulation of the liquid past the smooth heat transfer surface prevents the scale from forming. Thus, the time necessary for crystals to form and grow into a scale is not allowed during the actual heating; and the high velocity of the liquid and the high polish of the tube surfaces minimizes the opportunity for scale nuclei to form—or wipes them off if they do form. In another and more recently used heater for the dilute solution, heat transfer is by direct contact with another liquid, insoluble in the dilute aqueous solution, and of higher temperature. Thus, no metal heat transfer surface is contacted to be scaled during the heating process.

The invention is particularly useful in the conventional multiflash evaporation process, or in the so-called vapor reheat system of evaporation, a modification thereof; some improvements of which are described in copending applications Ser. No. 252,473, now U.S. Patent 3,329,583 of July 4, 1967, and also in Ser. No. 639,989, another continuation-in-part, of May 22, 1967. Herein, the dilute scale-forming solution, as sea water, may be preheated by a hotter water-insoluble liquid in a liquid-liquid-liquid heat interchanger to the high temperature, and then in the prime heater. Scale formation on a metallic surface is impossible in the use of the liquid-liquid-liquid heat exchanger.

Furthermore, in either vapor reheat or in other evaporation systems with sea water, there may be used a submerged combustion heater, wherein no metallic heat transfer surface contacts the hard water. The present system of removing scale is particularly useful with the submerged combustion heater. In some cases, the carbon dioxide from the combustion gases may accentuate scale formation by aiding in the formation of carbonates, which are, in general, quite insoluble when united with metals commonly present in dissolved, ionic form; except sodium.

Thus, there is provided a means for crystallizing out scale-forming salts of limited solubility by rapid heating of the dilute solution to a high temperature, and allowing a time of residence while at this high temperature in contact with the considerable surface of a bulk metal wire mesh, so that the scale crystallizes out on the surface of the metal mesh. Thus, the three essential features of scale forming are supplied: (a) a supersaturated solution due to the heating, (b) time for crystals to grow, (c) a large amount of surface for them to grow.

After the crystals have grown to remove the scale-forming constituents from the dilute solution, the bulk volume of the metal wire mesh is changed so as to distort the wire making up the mesh. This distortion of the flexible metal material, its surface, and the brittle scale adhering thereto, cause the latter to fragment and lose its adherence, to fall off as particles. Also, the scale layer on one wire is pressed against that on another wire, to cause both to crack and break off.

Wherein the changing of the bulk volume of the metal wire mesh after it is coated with scale may often be accomplished by a compression—as is usually indicated in this description, scale may form while the bulk of the mesh is relatively compressed. On expanding or stretching this bulk volume, the wires also are flexed to accomplish the same cracking off of the hard scale in small particles. One disadvantage of this usage is that compressed mesh does not have as much room for scale formation or circulation of the hard water being treated as does mesh in its normal bulk. However, the expanded mesh will allow the separation out of the scale particles better in this part of the cycle. In some cases, the separation of the scale particles is best accomplished by alternately expanding and contracting the bulk mesh several times to aid in the dislodgment of the scale particles and their settling out of the mesh. While expanding and subsequent contraction—or vice versa—may be done by mechanical force applied to the mesh, in either case a part of the energy in regaining the normal bulk volume is obtained by the natural resiliency of the wire—particularly in its construction in the mesh. In no case is it intended to deform permanently the wire by exceeding its elastic limit; and both expansion and contraction are maintained so as not to exceed the elastic limit of the wire itself. However, there are great possibilities for the wire to bend and the loops of the mesh to move among themselves within the mesh structure.

The invention described is useful in many types of heaters, evaporators, or boilers wherein the bulk volume of the metal mesh may occupy the volume wherein the liquid is in residence, while at or near substantially the highest temperature reached in the heat transfer, evaporation, boiling, or other operation. This volume and residence time may be allowed within the normal evaporating or other processing vessel; or it may be a quite separate vessel as may be required by the problems of design.

Other systems have allowed scale to form on rocks, metal balls, etc., which provide surface during a residence time to allow scale formation. However, only a relatively very small surface can be provided within the unit volume of the vessel on the external surfaces of such rocks, balls, etc., and the mass of rock or balls to be heated and cooled during the operation is very large. Furthermore, the grinding of the scale off of the rock consumes a relatively large amount of power, and uses substantial equipment.

Still other systems of scale removal have allowed scale to form on more or less flexible, slightly bowed, heating tubes, which, during use, rapidly decrease in heat transfer ability due to increasing insulation by the scale. By rapidly cooling the tubes with cold water, they bend due to thermal contraction, to crack off the scale. Here again, considerably more surface and tubes are required, due to reduction of capacity during scaling; and much heat is required for reheating the unit after the cooling.

As will be noted hereinafter, the present invention is quite different. It requires a very little increase in the usual equipment for the particular evaporation or other process use—only the very light wire mesh and a means for its compression and expansion—and no additional heating and cooling. The mesh is not part of the heat transfer surface; and the mesh as a whole is not moved—only its component parts are flexed internally.

FIGURE 1 is a diagrammatic flow sheet of one method of carrying out the invention wherein sea water is being heated to or near its boiling point at a particular pressure, either above or below atmospheric, by a submerged combustion of a fluid fuel, the combustion gases from which preheat the incoming sea water. A bulk mass of wire mesh occupies a substantial part of the heater vessel, which is large enough to provide a residence time of from 1 to 200 minutes for the liquid being heated at or near the highest temperature it reaches in the process. Means are provided for changing the bulk mass of mesh to a different overall volume, thus flexing the wire either by compression or expansion, and thus cracking off the inflexible scale. Means are also provided for discharging the heated liquid containing the solid particles of scale suspended therein or washed to discharge thereby.

SCALE FORMATION

Scale formation is one of the most serious problems in the heating and evaporation of sea water and other hard waters by the use of metallic surfaces to transfer heat to or from the aqueous liquid. Unless some provision is made for treatment by chemicals, scale forms at temperatures above about 175° F. for usual sea water, and at higher or lower temperatures for other hard waters, sometimes up to 375° F. depending on the amount and constituents of the scale-forming materials present, i.e., the degree of hardness. Some time is required for the crystallization of the salts which make up the scale-forming constituents. This time may be provided by allowing a residence or hold-up of the liquid, at or above this temperature, in a vessel of suitable volumetric capacity. Sometimes the scale formed is a soft, mud-like material; and then it passes through the evaporators or other equipment without trouble and is discharged with the effluent blowdown.

However, a hard, brittle scale may often be formed, depending on the constituents of the impurities; this may cause trouble by reducing the amount of heat which can be transferred through the tubes due to their coating and thus the increased thermal resistance, also by plugging or interfering with the action of other components of the evaporator, particularly the valves, sprays, or level controllers. Periodic cleanouts then may be required. These hard, brittle scales contain at least some part of the original scale-forming constituents, either the original salt itself, or some part of the salt molecule which is formed by chemical action at the higher temperature. The scale so formed, also sticks to the wires of the descaling device to be described below, used in the process of this invention. Such scales may be cracked off and removed as will be described, in the form of relatively small particles having a greatest dimension, usually of less than 2 or 3 millimeters, which, by the normal turbulence in the heaters and the flash evaporators or other equipment, are carried away, through the system, and eliminated. Additional scale, if there is a further tendency to form such throughout the residence time in the flash evaporators, may build up on these small particles as nuclei carried in the bulk of the liquid being processed, rather than on the surface of the equipment itself, particularly since the liquid is not heated by the surfaces and is usually warmer than the surfaces.

In the usual multiflash evaporator, a high velocity tubular heater is desired, having liquid passing inside of polished tubes to give a minimum hold-up time during the heating to the top temperature. The high velocity, the polished tubes, the very short residence time, all minimize the opportunity for crystal growth and scale formation during the heating operation. The same minimal time during heating usually is desired if the feed solution is preheated by flash evaporation of the hot condensate stream in the so-called vapor reheat flash evaporation method, as described in the copending application No. 252,473, now U.S. Patent No. 3,329,583, and elsewhere.

The prime heater of a flash evaporator or other system to utilize this invention is designed as a vessel of sufficient size to allow the residence or hold-up time for the volume of sea water flowing in the processing system, to crystallize or precipitate out scale, since some time is necessary for this physical or chemical process to take place, with crystal formation on available surfaces in contact with the hot liquid which is now supersaturated with respect to the salts which form scale on heating.

Besides this adequate volume to provide the residence time, a large amount of surface is highly desirable, on which scale may grow. Preferably the material supplying the surface should not greatly reduce the volume available to the liquid. This prime heater suitably may be in the form of a horizontal cylinder—or in any other shape; and the scale-removing mechanism herein described has been found equally effective whether operating with heat supplied to the dilute solution by a steam coil, a submerged combustion heater, or other device supplying a prime source of heat. Sea water and other hard waters precipitate or crystallize out scale coming from dissolved salts present in the hard water, while heating to an elevated temperature, due to a lowering of the effective solubility of the original scale-forming constituents at the higher temperature which is caused by:

(a) Dissolution of salts in the hard water such as calcium sulfate ($CaSO_4$), which have a lower solubility in hot water than in cold water; and whose saturation point therefore is exceeded by the higher temperature;

(b) Decomposition of salts originally present, at a higher temperature, to give less soluble materials, such as calcium bicarbonate ($Ca(HCO_3)_2$), comparatively soluble, which loses carbon dioxide, $CO_2$, and water, $H_2O$, on heating, to give the relatively insoluble calcium carbonate ($CaCO_3$) which precipitates, or scales out;

(c) Chemical action, i.e., silica plus soluble calcium salts originally present to give calcium silicate. Also, if submerged combustion is used, the carbon dioxide formed thereby and possibly oxygen, combines with calcium or magnesium salts of weak acids which might be present, under the high temperatures and pressures which may exist, and which then form insoluble carbonates. Thus, at high temperatures, calcium acetate in the presence of oxygen may be oxidized to water, carbon dioxide and calcium carbonate. The calcium carbonate is insoluble and precipitates.

METHOD OF DESCALING

A suitable surface upon which the crystals of scale can grow has been found to be that of a mesh formed of metal wire, with a very large free space between. The wire size desirable is between A.W.G. number 30 and number 10, (diameters from about 0.01 to 0.1 inch) loosely knit and formed in a bulk mesh in the manner of that used for "demisters"; in evaporators or distilling towers. A somewhat harder wire with more spring is desired in this use than for demisters.

One preferred method of construction of making the metal mesh standard in commerce—and useful for this process—starts with a continuous tubular "stocking" of 4″ to 10″ diameter, which is knit loosely from a wire of a size between numbers 24 and 16 A.W.G. (about 0.02″ and 0.05″). Some preference may be shown for a flattened wire, i.e., having the same cross-section in rectangular or ribbon form, as the round wire No. 24 to 16 A.W.G. The "ribbon" wire is much less stiff and more apt to take a permanent set. However, it has a greater surface area per unit weight of wire. The spacing of the wires may be in loops from about 3 to 15 millimeters, or ⅛″ to ⅝″ wide. Thus, a 10″ diameter stocking (knit on a somewhat larger ring of needles, because of construction during the knitting) with approximately ½″ loops, would have 64 loops and would be knit by 64 needles on the circular "head" of the knitting machine.

Wire of stainless steel, titanium, admiralty bronze, or other metal may be used, which does not corrode under the conditions of use. Also plastics drawn, usually in somewhat coarser monofilament fiber or cord, are used. Because of lesser stiffness of plastics, e.g., polypropylene, one of the preferred ones for this purpose, may be used in greater diameter than metal wires, e.g., up to 0.15 or even 0.2 inch. This tubular, or cylindrical stocking of diameter D inches then is run through a flattening roll to give a strip of double mesh of ½πD inches; and this strip is run through a crimping roll to corrugate it. The corrugations may be diagonal, and the reversal of alternate sides prevents the corrugations fitting together. Thus, the bulk mesh occupies much additional apparent or bulk volume. When piled in layers or rolled up like a ribbon, the wire mesh, when so formed and crimped, has a free space usually of from 90 to 99%, with the wires occupying a volume of only 1 to 10% of the apparent volume, usually 2 to 4%. The effective volume of the containing vessel is thus little reduced by the presence of the mesh.

The wire surface in such a mesh will vary from between about 10 and 100 square feet per cubic foot of bulk volume. Thus, there is a very large available surface for crystal growth, particularly in relation to the bulk volume occupied.

A pile is assembled of layers of strips of such wire mesh, usually after diagonal corrugation; and the pile is cut in the form of a cylinder, to fit inside a cylindrical vessel; or the flattened and corrugated stocking is rolled like tape or ribbon into discs of the desired diameter, which may be stacked to give a suitable height. This may be slightly smaller in diameter than the circular cross-section of the cylindrical vessel wherein the heated liquid is contained, to give a ratio of free volume to the apparent or bulk volume of 96 to 98%, i.e., a metal volume of 2 to 4% of the displaced or bulk volume. This gives a very large metal surface per unit volume; and the assembly is quite compressible due to the "spring" of the wire. The metal mesh in its most expanded form (i.e., maximum apparent volume) may occupy suitably from 15 to 60% of the total volume of the heater vessel. The bulk mesh may occupy any part or location of the volume of a heating vessel, boiler, evaporator, etc. where the liquid temperature is at its highest; or it may be in a separate vessel connected by suitable piping, valves, etc.

Other suitable methods are known of making metal mesh in large apparent bulk or volumetric form, as by weaving, folding, etc., also assemblies of fine metal turnings, etc. The knit mesh is only one illustrative example, since such bulk mesh is available on the market for various uses, as demisters, spring or shock absorbing pads for machinery, air filters, scouring pads for use on pots in the kitchen, etc.

The very large amount of surfaces of the component wires of the mesh allows scale to form thereon, due to the supersaturated conditions caused for the scale-forming salts, which were in an equilibrium solution at the low temperature of the feed sea water or other hard water. These become less soluble at the high temperature of the heated vessel, for reasons outlined above. In the normal use of this method of scale removal of sea water prior to a flash evaporation, the temperature of operation may be in the range of 170° to 350° F. However, in some other operations, such as wet combustion, the temperature of the heated liquid may rise to 500° to 700° F., with corresponding decrease of solubilities of the scale-forming salts and their precipitation. The hard water heated to an elevated temperature may lose some heat by cooling slightly; but it should be at substantially the highest temperature during the operation of the descaling process.

As the scale forms due to normal crystallizing or scale-forming action, it coats the wires which make up the mesh. When a suitable built-up layer of scale is formed, usually of a thickness varying between that of the radius and of the diameter of the wire itself, it may be removed. However, the scale formed, in some cases, may be allowed to build up to a thickness several times the diameter of the wire, depending on the percentage of the bulk volume occupied by the wire, its diameter, strength, and spring characteristics, the nature of the scale, etc.

The assembly of wire mesh when so coated with scale may then be compressed by 10 to 60% of its maximum apparent or bulk volume, to reduce its bulk volume to 90 to 40% of the maximum. Alternately, a similar amount of expansion or stretching may be used if the mesh was originally in service in a compressed-bulk state. The flexing of the wire caused by the compression or expansion of the bulk volume of the mesh causes the scale to break off in small pieces. These fall out in moving the mesh again to its original bulk. This compression or expansion may be done in any one of several ways.

One means for compression, which has been found suitable, uses a perforated piston plate pressing against one face of the composite mass of mesh and operated by an external mechanism. A shaft connects the piston to an external mechanism to provide lateral movement; e.g., a screw, hydraulically driven plunger, etc. The other face of the mesh is backed up with a fixed and perforated metal plate. Perforations in the piston plate and the perforated plate allow ready access of the water to the surfaces of the mesh.

The compression and flexing of the wires of the metal mesh causes the scale formed thereon to crack off; and the piston is then moved back to allow the mesh to spring back to its original apparent volume. Movement of the piston back and forth several times to compress and expand the bulk volume of the mesh secures complete dislodgment of the particles, and causes them to work to the bottom, down through the mesh, or with the liquid flow through the perforations of one of the boundary plates.

Scale particles may be washed out as a blow-down during the down period of one of two such units installed for alternate use; or, as usually in a flash evaporator, may be passed in a suspended form in the sea water through the flasher side of multiflash stages, finally discharging with the effluent brine from the lowest stage. These scale particles or crystals may grow in size from the additional crystallization of the scale-forming constituents present during the residence time in the flash evaporator chambers. Usually no shut-down is required or descaling, and no provision is necessary for scale separation from the effluent brine of the evaporator.

This descaling system may be incorporated in the prime heater, or in a suitable vessel connected thereto, desirably in series—after the heating—so that the heated solution may have a residence time at this high temperature from 1 to 200 minutes while in contact with the metal mesh surface on which it will deposit crystals. It is equally applicable for the usual multi-flash evaporation system, the vapor reheat system, and other evaporators or boilers in which there is a heat transfer surface or other means of heating the liquid.

This same method of descaling may be used in other similar conditions of heating and evaporation, where scale will form at a given temperature if allowed time and surface upon which to grow. This may be in vessels with various process liquids fitted with submerged combustion heaters or other types of heaters, or without any such heater whatsoever. There may be used a separate vessel containing only this mass of metal mesh and used only for this descaling purpose while attached to an evaporator, boiler, or heater by connecting piping, allowing circulation of the heated process liquid between the two vessels, usually after the heating and before subsequent evaporation or other processing.

The descaling method thus may be used as an accessory part to a usual flash evaporation (with or without a submerged combustion heater) and as applied to desalination of water, concentration of aqueous solutions, production of salt, etc. Also, it may be used in connection with evaporators or boilers with heat transfer surfaces, heated with steam, combustion gases, etc. It may be operated in a horizontal or vertical cylinder, or in a vessed of any other suitable shape. The amount of metal in the apparent volume, also the ratio of the apparent volume of the mesh to the total volume of the heated vessel, as well as the amount of compression or expansion for cracking off the scale, are not critical. However, with any given unit in a given service, the optimum time of scaling may be developed readily. This may be from 1 to 200 minutes, but usually will be from 10 to 60 minutes, a preferred range of time for allowing the crystallization of the scale-forming particles on the surfaces in the mesh.

FLOW SHEET OF DESCALING METHOD

FIGURE 1 diagrams one embodiment of this process of removing scaleforming constituents from, in this case, sea water, as an adjunct to, for example, a multi-flash evaporation for production of fresh water.

A vessel 10, which may be either horizontal or vertical and of any shape, is designed to withstand the pressure and other operating condition. It contains the liquid with constituents which are scale-forming at the high temperature to which it has to be brought for the processing in question, i.e., evaporation or other. A somewhat higher temperature may be used for accomplishing the scale precipitation and removal. The liquid therein, 11, may fill 10 to any level, 12; and often the vessel 10 may be completely filled to cover the wire mesh 13, which acts as a surface upon which scale should form. Alternately, the metal mesh may be in the lower part of the vessel; for example, a vertical cylinder which is covered by the liquid which does not fill the vessel, but has a vapor space above. Compressing or expanding the mesh may, in this case, be by vertical motion.

The rigid end plates 14 are on either side of the wire mesh, which in this case is indicated as closing substantially the cross-section of the vessel 10, although it is not necessary that 13 come close to the walls of the vessel 10. In the present case, the walls of 10 act as a suitable guide for the expansion and contraction of the mesh. There are perforations 17, in the end plates 14, which allow liquid to pass through, so that the liquid held within the bulk of the mesh is substantially that of its surroundings and has free access to inlet and outlet, heating, circulation, etc.

A means of compression and/or expansion of the metal mesh is necessary; and is exemplified in FIGURE 1 by the movable piston plate 14 attached to the mesh on the one side and to the piston rod 15 on the other. The piston rod 15 goes through the stuffing box 16, which maintains a tight seal by suitable packing against the pressure or vacuum, a the case may be, of the vessel. The movable piston, supplied with an external force the source of which is not shown, presses against the right, rigid end plate 14, to move it to the left, thus compressing the metal mesh 14 to a smaller apparent bulk volume during the time of the descaling operation.

In the present flow diagrams, heat to bring the hard water to the desired high temperature at which scale precipitates is supplied by a submerged combustion of a fluid fuel in the combustion chamber 18. This is supplied wtih air by pipe 20, and delivered by compressor 22, from an intake 21. The gas, oil, or other fluid fuel is supplied in 23, delivered by a pump or compressor 25, from an external source by the pipeline 24.

Gases from the combustion, along with some steam, leave by line 19 through a combustion gas cooler 29 shown in this case being supplied with sea water feed in at 34, in those cases where this is an evaporator for desalination. The sea water feed entering by line 34 is heated in the combustion gas cooler 29, passes through line 30 to the vessel 10, used in this case as the prime heater, with an internal combustion source of heat, and particularly as a holder for the descaling mesh 13. High velocity of flow of feed through 29 with low residence time for the sea water there, also direct contact of the sea water with the hot combustion gases, minimize any scale formation before the liquid reaches vessel 10. The combustion gases, after preheating the feed sea water pass through 24 to an expander 27, wherein some part of their mechanical energy is recovered in aiding the compression of the air in and the fuel gas in. The common drive shaft connects 27 and 25 and 22; and it also may connect to an additional steam cylinder for supplying added energy for the operation; or it may connect to a motor-generator unit which may supply energy when needed or produce electrical energy if there be excess in the outgoing gases.

Other means of supplying the prime heat necessary to bring the sea water or other dilute feed up to the desired elevated temperature may be by steam, direct fire, or otherwise. The temperature of the liquid 11, in the vessel 10, is sufficiently high—desirably from 175° to 350° F.—to allow the formation of scale, due to the relative insolubility of the original salts or of their products after chemical reaction at this temperature. This serves for the ordinary descaling operation, prior to evaporation of sea water; but in cases of wet combustion of organic materials referred to hereinafter, the temperature may be as high as 500° to 700° F.

The voume of the vessel 10 also is adequate to allow sufficient residence time, between 1 to 200 minutes, for the liquid to be held there while in transit, and desirably from 10 to 60 minutes, so that the crystallization of the scale on the mesh 13 can remove most of the undesirable constituents in the sea water, which thus comes to equilibrium with the solubility relations under the high temperature pertaining. The crystals grow to desired size on the mesh 13, to give an almost uniform coating, desirably of a thickness up to 1 to 2 mm. The discharge line 31 allows the liquid which has lost the substantial part of its scale-forming constituents to discharge from the vessel 10 to its further processing, e.g. flash evaporation.

Thus, during normal operation, the descaled liquid passes through 31 to the first stage of a multiflash evaporator, or to the first effect of an evaporator with heat transfer surface. Alternately, the hard water thus purified by softening due to the removal of the scale-forming constituents may be passed to a boiler or to other process use.

The scale is allowed to build up to the desired thickness, which will depend, to some extent on (a) the water being treated and its constituent impurities, (b) the size of the wire in the mesh, (c) the ratio of the capacity of the vessel 10 to the throughput of feed—which indicates the time of retention, (d) the temperature which it is desired to obtain—based on the subsequent processing step. Then the mesh has its bulk volume expanded or contracted so as to flex the wires and to crack off the scale thereby and to remove it also by the pressure of the wires and scale thereon against the scale on adjacent wires.

After the descaling operation, the scale particles fall from the wires of the mesh and are washed through by the flowing liquid. A sludge is formed which is passed out with the discharge through 31, and thence through the evaporator. Alternately, the vessel 10 may be one of two or more which are used in parallel—with one being descaled, while the other is building up scale. The slurry of scale in descaled water may be washed through by the usual feed stream, if sea water and valueless, or by another stream of water through line 37 and passed to waste through line 35, or to other processing, such as filtration, sedimentation for recovering the scale, and recycle of the aqueous solution to the process. Valve 32 would be closed, and valve 36 would be opened until the scale particles are discharged, after which valve 36 would be closed, valve 32 would be opened, and stream of descaled water without solid particles would pass again to the evaporator or other service. If auxiliary wash water through 37 is used, the valve on the normal inlet of feed 34 is closed.

The right backing ring disc 14 is designed to be movable; while the left backing ring shown is fixed. Thus, the piston in its movement compresses the mesh to a smaller volume against the left backing disc 14, and by removal of the compressing force allows the mesh to spring back to its original position. By attachment of the mesh to 14 and to 15, the mesh may be expanded, as 14 and the piston rod 15 are moved to the right.

VARIATIONS IN THE DESCALING METHOD

In heating by submerged combustion, as indicated in FIGURE 1, a system is used to heat the water to the maximum temperature without the transfer of heat through tubes or other metal surfaces, and thus causing scale to form in the heating operation. Furthermore, there also is the advantage that the carbon dioxide which is formed in the operation may cause more completely the precipitation of insoluble carbonates to secure better removal of salts which otherwise build up to form scale in a subsequent evaporation.

Submerged combustion also may take place between organic materials dissolved or suspended in the dilute aqueous feed solution oxygen, usually as air, supplied from the outside under the pressure pertaining. The temperature necessary for such a wet combustion to become self-sustaining is usually 300° to 350° F. but it may be 400° F. or even higher, depending on the nature and amount of the organic materials present. The temperature then may rise to 500° to 700° F. due to the heat given off in the wet combustion, and the total pressure may be as high as 200 atmospheres. The amount of the scale-forming salts which may be retained in solution are correspondingly reduced. Such dilute solutions or suspensions which have therein oxidizable organic material may be various waste liquors coming from production of wood pulp for paper production, from sewage, and sewage sludges, etc. Such sewage material may be from domestic, municipal, or industrial sources, and may be raw sewage or primary sludges after considerable dewatering, or secondary sludges after dewatering and biochemical and/or other processing.

In submerged combustion, wet combustion, or with any other form of heat supply, the vessel wherein the scale formation takes place must be designed to accommodate the required pressure. With usual solutions, this pressure will be at most the saturation pressure of water at the given temperature; plus that of the air or oxygen added and of the combustion gases which are present if combustion is used.

In some cases, the purpose of heating the dilute solution to the elevated temperature may be not an adjunct to a system concentrating the feed, i.e., in the usual evaporator, but may be primarily for the removal of scale and/or the conduction of other chemical operations which may take place at the elevated temperature. In this case, the hot liquid may be cooled by flash evaporation in one, several, or many steps; and the vapors for the one or more flash evaporation steps may be used to heat directly and by counter-current contacting in open condensation steps, of the same number as that of the flash evaporating steps, the incoming cold, hard water feed. Thus, the large amount of heat necessary to heat the hard water to the high temperature necessary for the descaling is largely recovered in preheating more feed. The discharge in pipe 31 of figure marked "To Evaporator" would be to a multiflash evaporator of a particular number of stages. The dilute feed 34 would be passed countercurrently in open condensation in the condensing zones of these stages, before it enters the prime heater, or if combustion is used, the combustion gas cooler 29. Thus, while there is evaporation in the flash stages, there is no net concentration by evaporation, since the vapors formed are added to the dilute feed in the open condensation zones where the feed liquid is in open, dispersed flow to allow large surfaces of liquid in contact with the vapors. The descaling gives a water which may be used for boiler feed, washing, e.g., laundry, drinking, and other purposes; and the product is about the same in amount as the feed since there is no net evaporation.

Usually in an evaporation system, the removal of the scale-forming constituents which are mainly salts—although silica, iron oxide, and other oxides may also contribute, at the highest temperature of the system, is sufficient to prevent any further formation of scale at the lower temperatures, even though there is concentration taking place due to removing water during the evaporation. The residual, dissolved, scale-forming salts, after the high temperature treatment, are so much more soluble at the lower temperatures reached in the evaporation system, that their saturation point usually is not reached, even in the lesser amount of water present, i.e., the greater concentration after the evaporation. However, if desired or necessary, an additional system, such as FIGURE 1, may be installed at another part of the processing and at a lower temperature, to provide surface for scale to form there during an additional residence time.

Usually it will be found that the small particles of scale cracked off the mesh and in suspension in the dilute solution will allow adequate surface for growth of crystals of scale-forming salts at the lower temperatures and higher concentrations of the subsequent evaporation steps. These particles have clean cleavage planes of the crystals of the salts of the scale, and thus are excellent nuclei for further growth of the scale-forming salts.

While mesh of metallic wire is referred to in this description of invention, this is only for convenience of expression and there may be used any other mesh of fibers, threads, thin crumbled or otherwise separated sheets, cloth or textiles, made up of glass, plastics (one of the many which is preferred being polypropylene), or other material having suitable properties to act like the mesh described herein. Adequate resistance to corrosion and temperature are required, also capability to be formed into a bulk mesh with a large amount of surface. The method of fabrication into what herein is called a mesh, may also vary to include any system giving a form to the constituent wires, fibers, sheets, etc., which by altering the bulk volume allows cracking off of scale which has been allowed to form. This ability of bulk volume of the mesh so formed to be compressed or expanded to flex the wires, fibers, threads, sheets, etc., to crack off the scale as indicated above is the essential feature of this invention.

Also, while scale-forming constituents are herein referred to loosely as salts—and the largest percentage are salts—other materials, such as silica, also iron oxide and others—may contribute to scale formation by precipitation in these or other forms after chemical reaction, and thus are to be included within the understanding of the appended claims.

I claim:

1. In the process of treating a dilute aqueous solution to remove from solution therein constituents which precipitate to form a scale containing at least some part of the original constituents, due to lower effective solubility at higher temperatures, the use of the following steps:
   (a) heating the said dilute solution to an elevated temperature;
   (b) maintaining in a containing vessel for a period of 1 to 200 minutes the said dilute solution at substantially the said elevated temperature while within the bulk volume of a mesh and in contact with all surfaces of said mesh which has a large surface area per unit volume, said mesh always being at substantially the same elevated temperature as said dilute solution with which it is in contact; and said bulk volume of said mesh occupying at least 15% of the volume of the containing vessel;
   (c) precipitating on the said surfaces of the said mesh, the said constituents which form scale due to their lower solubility at substantially said elevated temperature, so as to give a brittle scale, adherent to said surfaces; and
   (d) mechanically flexing the flexible components of said mesh so as to change its bulk volume by from 10% to 60%, thus breaking off the scale in small, solid particles, small by comparison with the size of the openings between the elements of the mesh.

2. In the process of claim 1, the use of an elevated temperature of at least 175° F.

3. In the process of claim 1, wherein the said scale is built up on the said surfaces to a thickness of not more than 3 millimeters.

4. In the process of claim 1, wherein the mechanical flexing of the flexible components of said mesh is by a contraction of the bulk volume of the mesh.

5. In the process of claim 1, wherein the mechanical flexing of the flexible components of said mesh is by an expansion of the bulk volume of the mesh.

6. In the process of claim 1, wherein the dilute aqueous solution is sea water.

7. In the process of claim 1, wherein the dilute aqueous solution contains organic material from sewage.

8. In the process of claim 1, wherein the mesh is made of metal wire from number 30 to number 10 A.W.G.; and fills the apparent volume with a free space of 90 to 99%.

9. In the process of claim 1, wherein the precipitation of the said constituents which form scale is due to a chemical reaction at or below the said elevated temperature, whereby the said original constituents which precipitate to form a scale change chemically to other materials having lower solubility in water.

10. In the process of claim 1, wherein the said dilute aqueous solution, after the removal of the said constituents which form scale, is passed through several stages of flash evaporation, the vapors from each flash evaporation being passed to open condensing zones to preheat the incoming feed of dilute aqueous solution passing in open, dispersed flow in the condensing zones countercurrently to the passing through the several stages of flash evaporation of the heated dilute aqueous solution after removal of the scale-forming constituents, thereby preheating the said feed of dilute aqueous solution, and cooling the said dilute aqueous solution after removal of scale-forming constituents.

11. In the process of claim 1, wherein the mesh is made of polypropylene drawn to a monofilament having a diameter less than 0.2 inch.

References Cited

UNITED STATES PATENTS

| 739,443 | 9/1903 | Pertz | 261—5 |
| 1,063,132 | 5/1913 | McDonald | 210—359 X |
| 1,795,743 | 3/1931 | Sprague | 210—57 |
| 3,329,583 | 7/1967 | Othmer | 203—10 |

FOREIGN PATENTS

| 17,372 | 1894 | Great Britain. |

OTHER REFERENCES

French, R. C.: Filter Media, Chemical Engineering, vol. 70, October 14, 1963, pp. 177–185 and 190–192 relied on.

Betz: Handbook of Industrial Water Conditioning, fifth edition, 1957, Betz Laboratories, Inc., Philadephia, Pa., p. 104 relied on.

MICHAEL E. ROGERS, *Primary Examiner.*